United States Patent
Mathew et al.

(10) Patent No.: US 7,924,518 B2
(45) Date of Patent: Apr. 12, 2011

(54) SYSTEMS AND METHODS FOR ADAPTIVE WRITE PRE-COMPENSATION

(75) Inventors: George Mathew, San Jose, CA (US); Yuan Xing Lee, San Jose, CA (US); Hongwei Song, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/199,325

(22) Filed: Aug. 27, 2008

(65) Prior Publication Data

US 2010/0053793 A1 Mar. 4, 2010

(51) Int. Cl.
G11B 5/02 (2006.01)
(52) U.S. Cl. .................. 360/25; 360/31; 360/45; 360/65
(58) Field of Classification Search .................. None
See application file for complete search history.

(56) References Cited

U.S. PATENT DOCUMENTS

| | | | | |
|---|---|---|---|---|
| 5,262,904 | A | * | 11/1993 | Tang et al. .................. 360/45 |
| 5,357,520 | A | | 10/1994 | Arnett et al. |
| 5,493,454 | A | * | 2/1996 | Ziperovich et al. ............. 360/45 |
| 5,517,146 | A | | 5/1996 | Yamasaki |
| 5,583,705 | A | * | 12/1996 | Ziperovich et al. ............. 360/45 |
| 5,781,358 | A | * | 7/1998 | Hasegawa ..................... 360/51 |
| 5,986,830 | A | | 11/1999 | Hein |
| 5,999,355 | A | | 12/1999 | Behrens et al. |
| 6,043,942 | A | | 3/2000 | Cunningham et al. |
| 6,091,560 | A | | 7/2000 | Du |
| 6,130,794 | A | | 10/2000 | Christensen |
| 6,134,691 | A | * | 10/2000 | Hirasaka ..................... 714/742 |
| 6,141,168 | A | | 10/2000 | Takahashi et al. |
| 6,147,828 | A | | 11/2000 | Bloodworth et al. |
| 6,181,505 | B1 | | 1/2001 | Sacks et al. |
| 6,208,481 | B1 | | 3/2001 | Spurbeck et al. |
| 6,212,024 | B1 | * | 4/2001 | Igarashi et al. .................. 360/51 |
| 6,243,031 | B1 | | 6/2001 | Jusuf et al. |
| 6,246,723 | B1 | | 6/2001 | Bliss et al. |
| 6,337,778 | B1 | * | 1/2002 | Gagne ............................ 360/51 |
| 6,356,402 | B2 | * | 3/2002 | Igarashi et al. ................. 360/51 |
| 6,396,651 | B1 | | 5/2002 | Grover |
| 6,404,572 | B1 | * | 6/2002 | Hong ............................. 360/45 |

(Continued)

FOREIGN PATENT DOCUMENTS

GB 2 320 688 7/1998

OTHER PUBLICATIONS

Cho and Lee, "An Estimation Technique for Nonlinear Distortion In High Density Magnetic Recording Channels", IEEE Transactions on Magnetics, vol. 34, No. 1, pp. 40-44 Jan. 1998.

(Continued)

*Primary Examiner* — Dismery E Mercedes
(74) *Attorney, Agent, or Firm* — Hamilton, DeSanctis & Cha

(57) ABSTRACT

Various embodiments of the present invention provide systems and methods for write pre-compensation. For example, various embodiments of the present invention provide methods for modifying magnetic information transfer. The methods include retrieving magnetically represented data from a storage medium, and converting the magnetically represented data to a series of data samples. A preceding pattern and a transition status is identified in the series of data samples, and an equalized channel response is computed based on an estimated NLTS value. An error value is computed that corresponds to a difference between the estimated NLTS value and an actual NLTS value, and a pre-compensation value is computed based at least in part on the error value.

21 Claims, 7 Drawing Sheets

U.S. PATENT DOCUMENTS

| | | | |
|---|---|---|---|
| 6,535,345 B1* | 3/2003 | Shimoda | 360/65 |
| 6,563,655 B1 | 5/2003 | Yamasaki et al. | |
| 6,621,648 B2 | 9/2003 | Elliot et al. | |
| 6,662,303 B1 | 12/2003 | Toosky et al. | |
| 6,671,244 B2 | 12/2003 | Honma | |
| 6,674,590 B2 | 1/2004 | Ottesen et al. | |
| 6,678,230 B2 | 1/2004 | Miyashita et al. | |
| 6,721,114 B1 | 4/2004 | Sutardja et al. | |
| 6,768,603 B2* | 7/2004 | Cideciyan et al. | 360/45 |
| 6,788,481 B2* | 9/2004 | Fang et al. | 360/31 |
| 6,894,854 B1 | 5/2005 | Carlson et al. | |
| 6,912,682 B1 | 6/2005 | Aoki | |
| 6,934,100 B2* | 8/2005 | Ueno | 360/31 |
| 6,937,415 B2 | 8/2005 | Galbraith et al. | |
| 7,012,772 B1 | 3/2006 | Vis | |
| 7,079,342 B1 | 7/2006 | Han et al. | |
| 7,092,179 B2 | 8/2006 | Yamanouchi | |
| 7,123,429 B2 | 10/2006 | Musungu et al. | |
| 7,123,430 B2* | 10/2006 | Musungu et al. | 360/51 |
| 7,126,773 B1* | 10/2006 | Taratorin | 360/46 |
| 7,193,802 B2 | 3/2007 | Cideciyan et al. | |
| 7,248,424 B2* | 7/2007 | Ueno | 360/25 |
| 7,256,954 B2 | 8/2007 | Serizawa | |
| 7,262,928 B1 | 8/2007 | Oberg | |
| 7,271,753 B1 | 9/2007 | Padukone | |
| 7,308,057 B1 | 12/2007 | Patapoutian | |
| 7,440,224 B2 | 10/2008 | Ehrlich et al. | |
| 7,446,966 B2* | 11/2008 | Kalahasthi et al. | 360/31 |
| 7,450,326 B2* | 11/2008 | Hidaka | 360/31 |
| 7,495,854 B2 | 2/2009 | Hutchins | |
| 7,542,227 B2 | 6/2009 | Che et al. | |
| 7,589,924 B2* | 9/2009 | Yoshizawa | 360/31 |
| 7,715,135 B1 | 5/2010 | Sutardja et al. | |
| 2002/0159350 A1 | 10/2002 | Ogura | |
| 2005/0117243 A1 | 6/2005 | Serizawa | |
| 2005/0190471 A1* | 9/2005 | Ueno | 360/25 |
| 2006/0061496 A1 | 3/2006 | Stein et al. | |
| 2006/0062125 A1 | 3/2006 | Horie et al. | |
| 2006/0117243 A1 | 8/2006 | Hyun-Wook Lee | |
| 2007/0041115 A1 | 2/2007 | Lee | |
| 2007/0047120 A1* | 3/2007 | DeGroat | 360/39 |
| 2007/0076313 A1 | 4/2007 | Hutchins et al. | |
| 2007/0140088 A1 | 6/2007 | Hino et al. | |
| 2008/0031114 A1 | 2/2008 | Hong et al. | |
| 2008/0037153 A1* | 2/2008 | Yoshizawa | 360/31 |
| 2008/0043358 A1* | 2/2008 | Nakagawa et al. | 360/46 |
| 2008/0081382 A1 | 10/2008 | Mathew | |

OTHER PUBLICATIONS

DeGroat et al., "Experimental Characterization of Media Noise Based on Equalized Synchronized Drive Data", IEEE Trans. Magnetics, vol. 37, No. 2, pp. 633-638, Mar. 2001.

Farhang-Boroujeny, Adaptive Filters: Theory and Applications. John Wiley & Sons Ltd, 1998, Chapter 11. pp. 373-379.

Kavcic and Patapoutian, "A Signal-Dependent Autoregressive Channel Model", IEEE Trans. Magnetics, vol. 35, No. 5, pp. 2316-2318, Sep. 1999.

Lin et al. "An estimation technique for accurately modelling the magnetic recording channel including nonlinearities." IEEE Trans. Mag, vol. 25, No. 5, pp. 4084-4086, Sep. 1989.

Moon, J., "Signal-to-Noise Ration Definition for Magnetic Recording Channels With Transition Noise", IEEE Trans. Magnetics, vol. 36, No. 5, pp. 3881-3883, Sep. 2000.

Palmer et al, "Identification of nonlinear write effects using pseudo-random sequences" IEEE Trans. Magnetics, vol. 23 No. 5, pp. 2377-2379, Sep. 1987.

Partovi et al., "Flow-Through Latch and Edge-Triggered Flip-Flop Hybrid Elements"; Feb. 8, 1996; pp. 138-139; Solid-State Circuits Conference 1996 Digest of Technical Papers.

Tokumasu et al. "A New Reduced Clock-Swing Flip-Flop (NDKFF)," Corp. Research & Devel. Center, Toshiba Corporation. IEEE Custom Integrated Circuits Conference Feb. 2002.

Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

SYSTEMS AND METHODS FOR ADAPTIVE WRITE PRE-COMPENSATION

BACKGROUND OF THE INVENTION

The present inventions are related to systems and methods for writing information to a magnetic storage medium, and more particularly to systems and methods for providing pre-compensation for use during a storage medium write.

Writing information to a magnetic storage medium includes generating a magnetic field in close proximity to the storage medium to be written. This may be done using a read/write head assembly as are commonly known in the art. One problem with such an approach to writing a magnetic storage medium is that the magnetic field generated during the write of a preceding bit pattern may interfere or otherwise affect a magnetic field generated during a write of a succeeding bit pattern. In particular, a magnetic field generated to write a current bit pattern may exhibit a non-linear transition shift (NLTS) caused by magnetic interactions between write-field and already written transitions. Presence of NLTS leads to data-dependent nonlinear distortions in the read back signal, causing degradation in data-recovery performance. Further, where NLTS becomes significant, the media exhibiting the NLTS may be disqualified, thus resulting in poor yield of the media.

Various systems employ a write pre-compensation scheme that considers preceding bit patterns in the process of generating a magnetic field to write a succeeding bit pattern. Such systems search over a multi-dimensional grid to determine the amount of any compensation to be added to a given write. The criterion used during the search process may be based on the error rate of the detector or another indicator. This searching process is, however, time consuming and becomes almost impractical for multi-level compensation scenarios where compensation for several potential patterns must be considered. Moreover, unlike the usual channel optimization tasks, such write compensation demands a separate write and read for each choice of the compensation. As a result, a relatively simple compensation scheme (e.g., a single level or a two level compensation scheme) is typically chosen to limit the complexity. Such simple compensation schemes are not, however, capable of providing the degree of compensation desired in some applications.

Hence, for at least the aforementioned reasons, there exists a need in the art for advanced systems and methods for write pre-compensation.

BRIEF SUMMARY OF THE INVENTION

The present inventions are related to systems and methods for writing information to a magnetic storage medium, and more particularly to systems and methods for providing pre-compensation for use during a storage medium write.

Various embodiments of the present invention provide methods for modifying magnetic information transfer. The methods include retrieving magnetically represented data from a storage medium, and converting the magnetically represented data to a series of data samples. A preceding pattern and a transition status are identified in the series of data samples, and an equalized channel response is computed based on an estimated NLTS value. An error value is computed that corresponds to a difference between the estimated NLTS value and another calculated NLTS value, and a pre-compensation value is computed based at least in part on the error value. In some cases, the estimated NLTS value is a preceding estimated NLTS value. In various instances, the pre-compensation value is operable to compensate for the calculated NLTS value. Identifying the preceding pattern may be done in accordance with various pre-compensation schemes including, but not limited to, a one level pre-compensation scheme, a two level pre-compensation scheme, a three level pre-compensation scheme, or a six level pre-compensation scheme.

In some instances of the aforementioned embodiments, the methods further include computing a second pre-compensation value using the same series of data samples. Thus, in some cases, a single continuous read may be used as the source of multiple pre-compensation values. The series of data samples is read in a single read operation from a magnetic storage medium. In various instances of the aforementioned embodiments, the methods further include eliminating at least one second order term in the computation of the pre-compensation value, such that the effect of MR asymmetry is reduced.

In one or more instances of the aforementioned embodiments, the methods further include storing the pre-compensation value in relation to the identified preceding pattern. A request to write a data set is received, and the pre-compensation value is used in relation to servicing the request to write the data set. In some cases, using the pre-compensation value in relation to servicing the request to write the data set includes: identifying a write pattern in the data set; and using the identified write pattern to retrieve the stored pre-compensation value.

In various cases, the magnetically represented data is derived from a random data pattern previously written to the storage medium. In some cases, the random data pattern is written to the storage medium using a single continuous write operation. One or more embodiments of the present invention further include eliminating at least one second order term in the computation of the pre-compensation value to reduce the effect of MR asymmetry. In some cases, the methods further include eliminating at least one linear term in the computation of the pre-compensation value to reduce the effect of linear mis-equalization.

Other embodiments of the present invention provide systems for determining write pre-compensation values. Such systems include a magnetic storage medium, a read/write head assembly, and a pre-compensation value calculation circuit. The pre-compensation value calculation circuit includes: an equalizer circuit operable to equalize a data set read from the magnetic storage medium via the read/write head assembly; an equalized channel model circuit that is operable to provide an equalized channel response based on at least one estimated NLTS value; and an adaptive NLTS estimation circuit that provides at least the one estimated NLTS value based in part on the equalized channel response and a portion of the equalized data set. In some cases, the equalized channel model circuit is implemented using a processor associated with a computer readable medium. The computer readable medium includes instructions executable by the processor to calculate the equalized channel response based on the at least one estimated NLTS value. In various cases, the adaptive NLTS estimation circuit is implemented using a processor associated with a computer readable medium. The computer readable medium includes instructions executable by the processor to calculate the at least one estimated NLTS value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
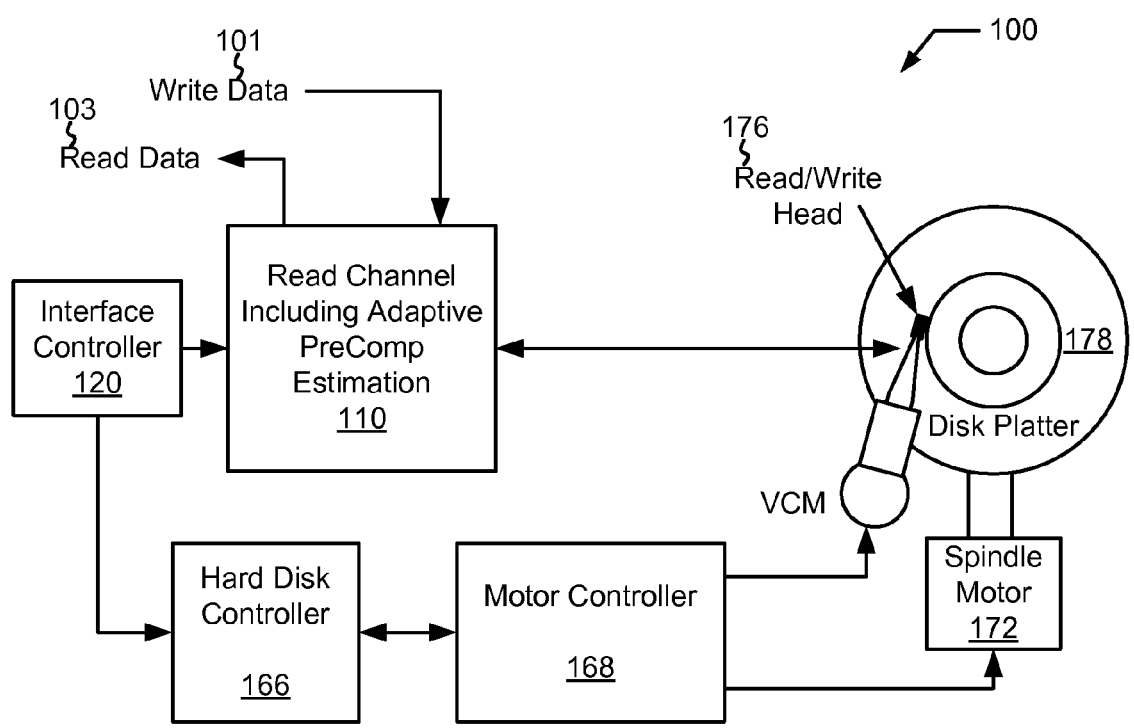
FIG. 1 depicts a storage system with a read channel including an adaptive pre-compensation estimation module in accordance with various embodiments of the present invention.

The present inventions are related to systems and methods for writing information to a magnetic storage medium, and more particularly to systems and methods for providing pre-compensation for use during a storage medium write.

Various embodiments of the present invention provide write pre-compensation that adaptively estimates the pre-compensation offsets using a parallel approach. In some cases, such pre-compensation offsets are manifest in the form of a delay, where the delay is designed to compensate for NLTS such that a write data is written to a desired location on a storage medium. Based on the disclosure provided herein, one of ordinary skill in the art will appreciate other compensation offsets that may be used in relation to various embodiments of the present invention. Unlike existing approaches, such a parallel approach does not necessarily involve a serial search and thus uses substantially fewer read and write operations to resolve the write pre-compensation. In particular, some embodiments of the present invention utilize a single random pattern that is read back from the magnetic storage medium and used to estimate NLTS and pre-compensation values. As used herein, the term "random pattern" is used in its broadest sense to mean any pattern that is not specifically tailored to include a particular pattern of bits. Thus, a random pattern may be derived from a pseudo-random pattern generator, or may be bits that have been written to a storage medium through general use of the storage medium over time. Such a parallel approach substantially reduces the time required to determine pre-compensation values allowing for an increase in pre-compensation that is performed. Thus, in some embodiments of the present invention, only one write and read operation is used to determine appropriate pre-compensation offsets for a large number of write operations. In other embodiments, multiple writes and reads may be employed.

In some cases, a read back signal obtained from a magnetic storage medium is observed at the output of the equalizer. Then, the NLTS delays are estimated by adaptively minimizing the mean-square error between the equalizer output samples and a model output. The model is constructed from the primary equalization target and is parameterized by the NLTS delays. The adaptive algorithm converges to the NLTS delays. The pre-compensation offsets are then set as negative of the corresponding NLTS delays. These pre-compensation offsets are then stored to a table referenced using the pattern to which the respective pre-compensation offsets correspond. When a subsequent write operation is performed, the appropriate pre-compensation offset is retrieved from the table and added to the write process such that it cancels the NLTS.

In some embodiments of the present invention, implementation of the above described adaptive algorithm is improved. In particular, direct application of the above described algorithm may not produce a highly accurate result due to the affect of mis-equalization on the estimated NLTS delays and the amount of asymmetry caused by a magneto-resistive read-head. This is because the nonlinear distortions resulting from magneto-resistive asymmetry and NLTS have some common terms, leading to their interaction during adaptive estimation of NLTS. Similarly, presence of NLTS also leads to linear distortion in the read back signal which has common terms with mis-equalization. Such embodiments of the present invention modify the gradient term by removing most of the terms that are common between NLTS, mis-equalization and the magneto-resistive asymmetry.

Turning to FIG. 1, a storage system 100 is depicted including a read channel 110 with an adaptive pre-compensation estimation module in accordance with various embodiments of the present invention. Storage system 100 may be, for example, a hard disk drive. Read channel 110 may include any adaptive pre-compensation circuitry capable of efficiently determining pre-compensation values to be used in one or more write operations. As an example, the adaptive pre-compensation circuitry may be, but is not limited to, that described below in relation to FIG. 2 or FIG. 4. In addition, storage system 100 includes an interface controller 120, a hard disk controller 166, a motor controller 168, a spindle motor 172, a disk platter 178, and a read/write head 176. Interface controller 120 controls addressing and timing of data transfer to/from disk platter 178. Disk platter 178 may be any magnetic storage medium known in the art including, but not limited to, a longitudinal magnetic storage medium or a perpendicular magnetic storage medium. The data on disk platter 178 consists of groups of magnetic signals that may be detected by read/write head assembly 176 when the assembly is properly positioned over disk platter 178. In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs).

Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel module 110. In turn, read channel module 110 decodes and digitizes the received analog signal to recreate the information originally written to disk platter 178. This data is provided as read data 103 to a receiving circuit. A write operation is substantially the opposite of the preceding read operation with write data 101 being provided to read channel module 110. This data is then encoded and written to disk platter 178. Of note, read channel module 110 is capable of writing information to disk platter 178 and subsequently reading the data back. The read back data is used to estimate pre-compensation offsets that may be maintained in a memory. The stored pre-compensation offsets may be retrieved from the memory and used during subsequent writes to compensate for NLTS.

Figure 2:
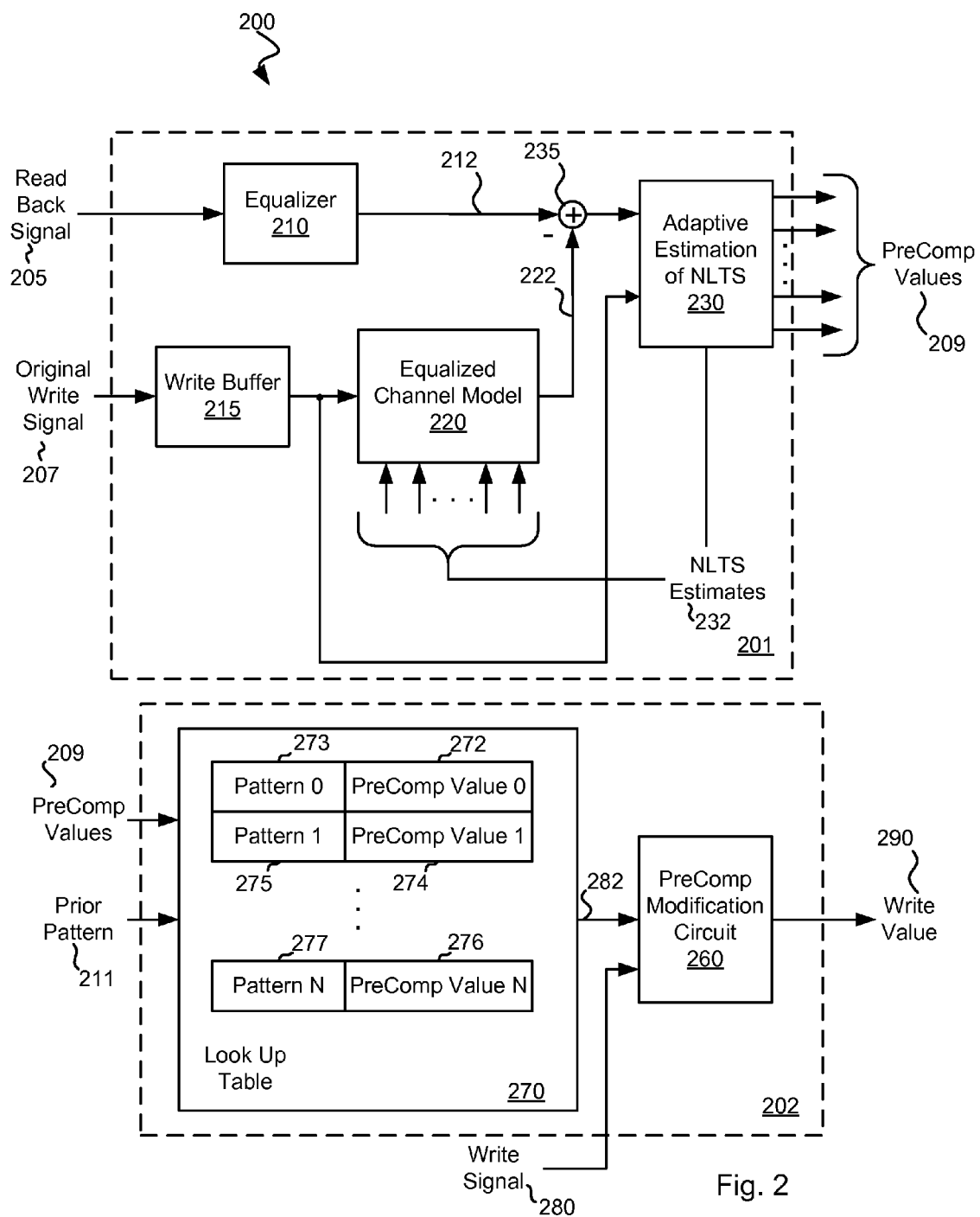
FIG. 2 shows one implementation of the adaptive pre-compensation estimation module of FIG. 1 in accordance with one or more embodiments of the present invention.

Turning to FIG. 2, an adaptive pre-compensation estimation module 200 is depicted in accordance with one or more embodiments of the present invention. Adaptive pre-compensation estimation module includes a pre-compensation determination circuit 201 (shown in dashed lines) and a pre-compensated write circuit 202 (shown in dashed lines). In some cases, pre-compensation determination circuit 201 is used during an initialization process used to generate pre-compensation values, and the pre-compensated write circuit 202 is used during a later write phase that relies on the earlier generated pre-compensation values. Pre-compensation determination circuit 201 includes an equalizer 210 that equalizes a read back signal 205 (e.g., data received from a read/write head assembly). Equalizer 210 may be any circuit known in the art that is capable of performing signal equalization. In one particular embodiment of the present invention, equalizer 210 is a digital finite impulse response circuit. Equalizer 210 generates an equalized read back signal 212, x[n], in accordance with the following equations:

$$x[n] = \sum_{k=0}^{Ng} a[n-k]g_b[k] - \sum_{k=L1}^{L2} \hat{\Delta}[n-k]b[n-k]g_i[k] + v[n];$$

and $$b[n] = a[n] - a[n-1],$$

where a[n] is an original write signal 207 provided to an equalized channel model circuit 220 via a write buffer 215. For establishing pre-compensation values, a random pattern provided as original write signal 207 may be preferred over a periodic pattern. Write buffer 215 may be any device or circuit capable of receiving the originally written data and storing it for later retrieval. Equalized channel model circuit 220 provides an equalized channel response 222 based on estimated NLTS values 232 in accordance with the following equation:

$$d[n] = \sum_{k=0}^{Ng} a[n-k]g_b[k] - \sum_{j=1}^{8} \hat{\Delta}_j \sum_{k=L1}^{L2} b_j[n-k]g_i[k].$$

Equalized channel response 222 is subtracted from equalized read back signal 212 using a summation element 235. The output from summation element 235 is an error, e[n], that is provided to a circuit 230 operable to adaptively calculate NLTS estimates 232 and to provide pre-compensation values 209. Estimated NLTS values 232 are calculated in accordance with the following equation:

$$\hat{\Delta}_l[n+1] = \hat{\Delta}_l[n] - 2\mu e[n] \sum_{k=L1}^{L2} b_l[n-k]g_i[k],$$

for l = 1, 2, ... , 8.

Pre-compensation values 209 are calculated to negate the effect of corresponding estimated NLTS values 232. In one implementation, pre-compensation values 209 are the negative of corresponding estimated NLTS values 232. Other approaches for calculating pre-compensation values 209 based on NLTS estimates may also be used.

Pre-compensated write circuit 202 includes a memory in which a lookup table 270 is implemented. Lookup table 270 stores pre-compensation values 209 in association with a preceding pattern 211 to which they respectively correspond. Said another way, to obtain a pre-compensation value associated with a particular pattern, the particular pattern or some unique variation thereof may be used to address lookup table 270. In particular, lookup table 270 includes a pre-compensation value 272 corresponding to a pattern 273, a pre-compensation value 274 corresponding to a pattern 275, and a pre-compensation value 276 corresponding to a pattern 277. Based on the disclosure provided herein, one of ordinary skill in the art will recognize that practically any quantity of pre-compensation values corresponding to different patterns may be stored in lookup table 270. When a particular pattern or a unique variation thereof is used to address lookup table 270, the corresponding pre-compensation value is provided as an output 282. A write signal 280 is provided to a pre-compensation modification circuit 260 that modifies the write signal using output 282. The modification operates to negate the NLTS identified by pre-compensation determination circuit 201.

It should be noted that while various components of adaptive pre-compensation estimation module 200 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive pre-compensation estimation module 200 is implemented entirely as firmware or software being executed by a processor. In other embodiments of the present invention, adaptive pre-compensation estimation module 200 is implemented entirely as a dedicated electronic circuit. In yet other embodiments of the present invention, adaptive pre-compensation estimation module 200 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

The algorithm implemented by adaptive pre-compensation estimation module 200 is more fully developed below. In particular, the output of equalizer 210 may be expressed as x[n] as defined by the following equations:

$$x[n] = \sum_{k=0}^{Ng} a[n-k]g_b[k] - \sum_{k=L1}^{L2} \hat{\Delta}[n-k]b[n-k]g_i[k] + v[n] \quad (1a)$$

$$b[n] = a[n] - a[n-1] \quad (1b)$$

In these equations, a[n] with a[n]∈{−1,+1} represents original write signal 207 available from write buffer 215; b[n] with b[n]∈{−2,0,+2} represents a transition sequence corresponding to a[n]; $g_b[k]$ denotes the bit response of the channel up to the output of equalizer 210 for k=0, 1, 2 . . . $N_g$; ($N_g$+1) denotes the number of coefficients in the bit response; $g_i[k]$ denotes the corresponding impulse response of the equalized channel for k=L1, L+1 . . . L2; $\hat{\Delta}[n]$ denotes the NLTS associated with the transition b[n] and provided as NLTS estimates 232; $\hat{\Delta}[n+1]$ denotes the calculated NLTS that are provided as pre-compensation values 209; and v[n] denotes the total noise at the output of equalizer 210.

For simplicity, it is assumed that the mis-equalization component at the output of equalizer 210 is included in v[n]. Thus, $g_b[k]$ is taken to be the primary equalization target, where $N_g$ is, for example, an integer value 1 or an integer value 2. Equations 1a and 1b also assume a read/write head assembly used to obtain data from a magnetic storage medium does not exhibit other significant distortions beyond NLTS.

The following Table 1 shows exemplary pre-compensation values (i.e., pre-compensation delays expressed as a fraction of a bit period) based on preceding bit patterns.

TABLE 1

Exemplary Pre-compensation Values Based on Preceding Bit Patterns

| Pattern Index k | Preceding Bits (Oldest First) {$S_{k3}, S_{k2}, S_{k1}$} | Current Bit {$S_{k0}$} | Pre-Compensation Value |
|---|---|---|---|
| 1 | {−1, −1, −1} | +1 | $\delta_1$ |
| 2 | {+1, +1, +1} | −1 | $\delta_2$ |
| 3 | {+1, +1, −1} | +1 | $\delta_3$ |
| 4 | {−1, −1, +1} | −1 | $\delta_4$ |
| 5 | {+1, −1, −1} | +1 | $\delta_5$ |
| 6 | {−1, +1, +1} | −1 | $\delta_6$ |
| 7 | {−1, +1, −1} | +1 | $\delta_7$ |
| 8 | {+1, −1, +1} | −1 | $\delta_8$ |

Using the values from Table 1, NLTS can be expressed as:

$$\hat{\Delta}[n] = \sum_{k=1}^{8} c_k[n]\Delta_k \quad (2)$$

where $c_k[n]$ are indicator functions assuming values of {0,1} for values of k=1, 2, . . . , 8. Said another way, $c_k[n]$=1 denotes an occurrence of a transition corresponding to the $k^{th}$ row in Table 1 at instant n. Conversely, $c_k[n]$=0 denotes that a transition that occurred at an instant n does not correspond to the $k^{th}$ row in Table 1. Again, using Table 1, the index functions can be defined according to the following equation:

$$c_k[n] = \frac{(1+S_{k0}a[n])*(1+S_{k1}a[n-1])*(1+S_{k2}a[n-2])*(1+S_{k3}a[n-3])}{16} \quad (3)$$

where {$S_{k3}, S_{k2}, S_{k1}, S_{k0}$} correspond to the bits of the $k^{th}$ pattern of Table 1. Substituting equation (2) into equation (1) yields:

$$x[n] = \sum_{k=0}^{Ng} a[n-k]g_b[k] - \sum_{j=1}^{8} \Delta_j \sum_{k=L1}^{L2} b_j[n-k]g_i[k] + v[n] \quad (4)$$

where $b_j[n]=c_j[n]*b[n]$. Based on equation (3) and equation (1b), $b_j[n]$ can be expressed for j=1, 2, 3, . . . , 8 as equation (5):

$$b_j[n] =$$

$$\{(S_{j0} - S_{j1})(1 + S_{j2}a[n-2] + S_{j3}a[n-3]) + (1 - S_{j0}S_{j1})(a[n] - a[n-1]) +$$

$$(S_{j1} - S_{j0})a[n]a[n-1] + S_{j2}(S_{j0}S_{j1} - 1)a[n-1]a[n-2] +$$

$$S_{j2}S_{j3}(S_{j0} - S_{j1})a[n-2]a[n-3] + S_{j2}(1 - S_{j0}S_{j1})a[n]a[n-2] +$$

$$S_{j3}(S_{j0}S_{j1} - 1)a[n-1]a[n-3] + S_{j3}(1 - S_{j0}S_{j1})a[n]a[n-3] +$$

$$(S_{j1} - S_{j0})(S_{j2}a[n]a[n-1]a[n-2] +$$

$$S_{j3}a[n]a[n-1]a[n-3] + S_{j2}S_{j3}(S_{j0}S_{j1} - 1)$$

$$(a[n-1]a[n-2]a[n-3] - a[n]a[n-2]a[n-3]) +$$

$$S_{j2}S_{j3}(S_{j1} - S_{j0})a[n]a[n-1]a[n-2]a[n-3]\}/16$$

Using equation (4), the samples at output 222 (i.e., d[n]) can be expressed as:

$$d[n] = \sum_{k=0}^{Ng} a[n-k]g_b[k] - \sum_{j=1}^{8} \hat{\Delta}_j \sum_{k=L1}^{L2} b_j[n-k]g_i[k] \quad (6)$$

where $\hat{\Delta}_j$ are estimated NLTS values 232 for j=1, 2, 3, . . . , 8.

NLTS values 232 may be estimated by minimizing the mean-square value of the error, e[n]. This is done by adaptively using the known instantaneous gradient based least mean-square adaptive algorithm. The error signal and its gradients with respect to the NLTS values 232 in the channel model are given by the following equations:

$$e[n] = x[n] - d[n] \quad (7a)$$

$$= x[n] - \sum_{k=0}^{Ng} a[n-k]g_b[k] + \sum_{j=1}^{8} \hat{\Delta}_j \sum_{k=L1}^{L2} b_j[n-k]g_i[k]$$

$$\frac{\partial e[n]}{\partial \Delta_l} = \sum_{k=L1}^{L2} b_l[n-k]g_i[k] \quad (7b)$$

Based on equations (7), the process of the adaptive algorithm for estimating NLTS values 232, $\hat{\Delta}_l[n+1]$, is described by the following equations:

$$\hat{\Delta}_l[n+1] = \hat{\Delta}_l[n] - 2\mu e[n] \sum_{k=L1}^{L2} b_l[n-k]g_i[k], \quad (8a)$$

for l = 1, 2, . . . , 8

$$e[n] = x[n] - \sum_{k=0}^{Ng} a[n-k]g_b[k] + \sum_{j=1}^{8} \hat{\Delta}_j \sum_{k=L1}^{L2} b_j[n-k]g_i[k] \quad (8b)$$

$$b_j[n] = c_j[n] * b[n] \quad (8c)$$

In equations (8), μ is the adaptation step size (or adaptation gain), and $\hat{\Delta}_l[n]$ denotes the estimate of $\Delta_l$ at an instant n (i.e., the $l^{th}$ NLTS value 232).

Computation of the error term, e[n], relies on computation of the bit response, $g_b[k]$, and the impulse response, $g_i[k]$, for the equalized channel. The bit response can be taken as the primary equalization target of equalizer 210. In some embodiments, this primary equalization target is two or three taps long (i.e., $N_g$ is one or two) depending on the desired design. The impulse response is the time based derivative of the step response. Computing the impulse response may be done using a two step process. In the first step, the step response of the channel is determined. For a primary target given by $g_b[k]$ for k=0, 1, ..., $N_g$, the following step response is obtained:

$$g_s[k] = -0.5 \sum_{i=0}^{Ng} g_b[i], \text{ for } k < 0 \quad (9a)$$

$$g_s[k] = 0.5 \left( \sum_{i=0}^{k} g_b[i] - \sum_{i=k+1}^{Ng} g_b[i] \right), \text{ for } 0 <= k <= (Ng-1) \quad (9b)$$

$$g_s[k] = 0.5 \sum_{i=0}^{Ng} g_b[i], \text{ for } k >= Ng \quad (9c)$$

In this case, k=0 is the instant at which the transition in the input takes place. Next, the step response is differentiated to yield the impulse response. This may be done numerically by taking the difference between the step response shifted to the right by $\epsilon$ from that shifted to the left by $\epsilon$. The resulting difference is then divided by $2\epsilon$. In some embodiments of the present invention, raised-cosine interpolation filters with excess bandwidth are used to generate the shifted step responses, and $\epsilon$ is chosen to be 0.005. Using five tap interpolation filters, the impulse response is set forth in the following equations:

$$g_i[k] = 0, \text{ for } k < 0 \quad (10a)$$

$$g_i[k] = \sum_{i=0}^{4} f[i]g_s[k-i], \text{ for } 0 <= k <= (Ng+3) \quad (10b)$$

$$g_i[k] = 0, \text{ for } k >= Ng+4 \quad (10c)$$

As an example, where the differentiating filter coefficients are given by:

[f[0], f[1], ..., f[4]]=[−0.2593, 0.8584, 0.00, −0.8584, 0.2593], it is understood that L1=0 and L2=Ng+3. It should be noted that other filter lengths may be used in accordance with different embodiments of the present invention.

The instantaneous gradients used for adapting NLTS estimates 232 are given by:

$$Grad_l[n] = e[n] \sum_{k=L1}^{L2} b_l[n-k]g_i[k], \text{ for } l = 1, 2, \ldots, 8. \quad (11)$$

As discussed in relation to equation (1a) above, the error samples, e[n], include residual inter-symbol interference caused by mis-equalization through the noise component, v[n]. Also, based on equation (5) above, the quantities $b_l[n]$ contain terms that are linear in data bits. Mis-equalization can be quite significant, especially where the primary target is short. Since the adaptive algorithm tries to drive the average gradients to zero, the noise evident in e[n] and $b_l[n]$ imply that NLTS estimates 232 will be affected by mis-equalization. To alleviate the effect of mis-equalization, the terms in $b_l[n]$ that are linear in data bits are removed from either $b_l[n]$ or from e[n]. In one particular embodiment of the present invention, they are removed from $b_l[n]$ by removing $$\{(S_{j0}-S_{j1})(1+S_{j2}a[n-2]+S_{j3}a[n-3])+(1-S_{j0}S_{j1})(a[n]-a[n-1])\}/16$$

from $b_l[n]$ described in equation (5) above.

In addition, where a magneto-resistive read/write head assembly is used to interact with a magnetic storage medium, the head itself introduces amplitude asymmetry in read back signal 205 (i.e., MR asymmetry). In some cases, a MR asymmetry compensation circuit in the analog front end of a storage device may be included to reduce the affect of such MR asymmetry. However, even with such analog front end compensation, some residual amount of MR asymmetry is likely to remain in the signal. This MR asymmetry may introduce second-order distortion in read back signal 205. Therefore, even in the absence of NLTS, read back signal 205 may contain second-order products of the data-bits, such as, for example, a[n−k]a[n−l]. Further, the terms $b_l[n]$ caused by NLTS also contain second-order products of the data bits as shown in equation (5). These terms are used to distinguish between the rising and falling transitions. Since the adaptive algorithm discussed above does not distinguish the second order terms caused by MR asymmetry, the resulting NLTS estimates 232 will be affected by MR asymmetry. To alleviate this problem, the terms that are second-order in data-bits are removed from $b_l[n]$ in equation (8a) above. However, not all of the second order terms can be removed without eliminating the ability to distinguish between rising and falling transitions. As a compromise, some embodiments of the present invention remove some of the second order terms, but maintain others to assure an ability to distinguish transitions. Further, for the same reason, fourth order terms are also removed from $b_l[n]$. For example, removal of the above mentioned terms results in the following implementation (equation (12)) used in relation to one particular embodiment of the present invention:

$$\hat{b}_j[n] =$$
$$\{[S_{j3}(S_{j0}S_{j1}-1)a[n-3] + (S_{j1} - S_{j0})(a[n] - a[n-1])]S_{j1}S_{j2}a[n-2] +$$
$$S_{j3}(S_{j0}S_{j1}-1)a[n-1]a[n-3] - S_{j3}(S_{j0}S_{j1}-1)a[n]a[n-3] +$$
$$(S_{j1} - S_{j0})(S_{j2}a[n-2] + S_{j3}a[n-3])a[n]a[n-1] +$$
$$S_{j2}S_{j3}(S_{j0}S_{j1}-1)(a[n-1] - a[n])a[n-2]a[n-3]\}/16$$

In such embodiments, $b_l[n]$ given by equation (5) is used to calculate the error terms, e[n], and $\hat{b}_j[n]$ given by equation (12) is used to calculate the gradient.

Figure 3:
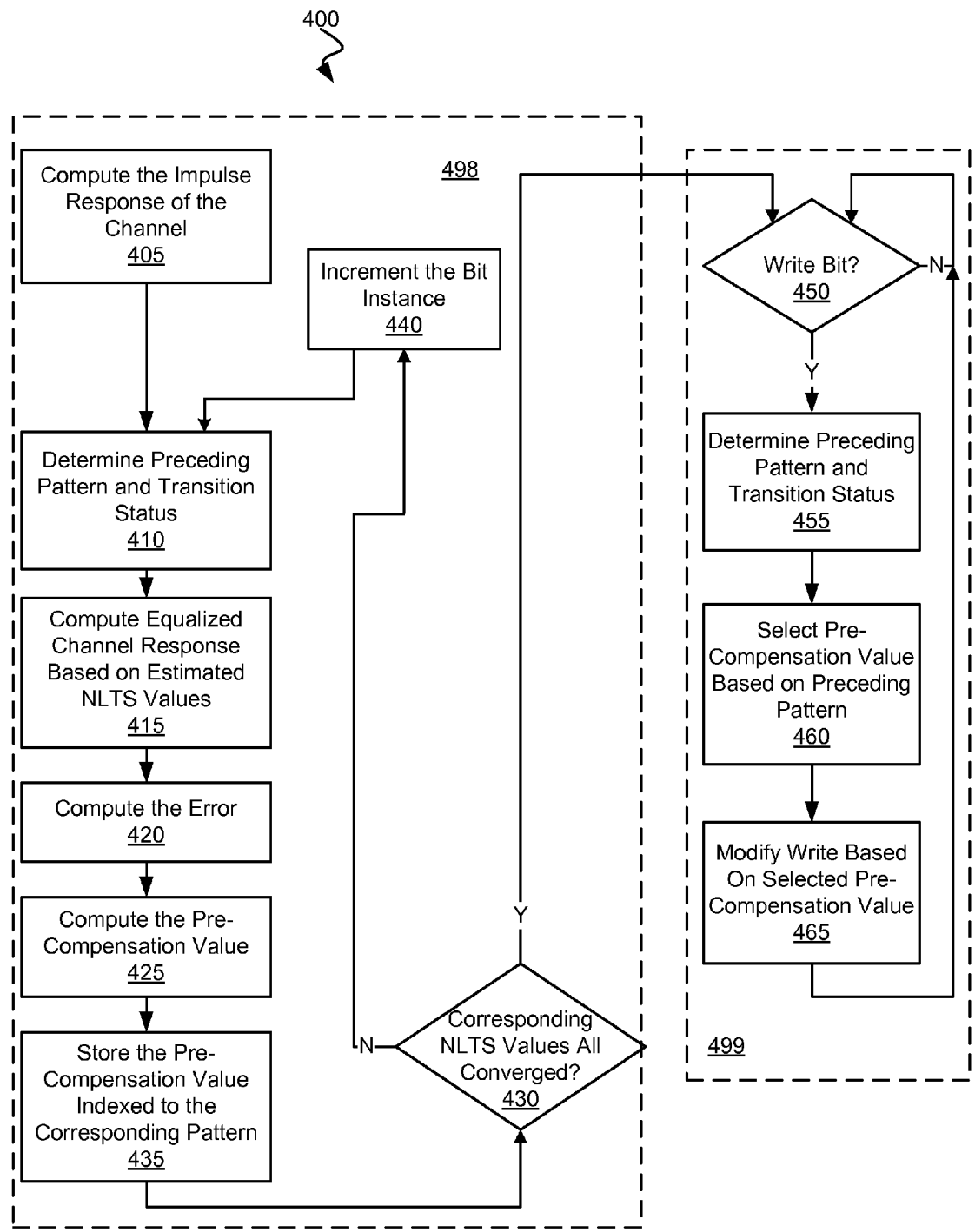
FIG. 3 is a flow diagram showing a method in accordance with some embodiments of the present invention for determining and using write pre-compensation values.

Turning to FIG. 3, a flow diagram 400 depicts a method in accordance with some embodiments of the present invention for determining and using pre-compensation values 209. Flow diagram 400 includes two sections: a section 498 covering functions that would generally be done using a pre-compensation determination circuit, and a section 499 covering functions that would generally be done using a pre-compensated write circuit. Following flow diagram 400, the impulse response ($g_i[k]$) for the channel is calculated (block 405). In some embodiments of the present invention, computing the impulse response is accomplished using a five tap interpolation filter in accordance with equations (10) which are restated below for simplicity:

$$g_i[k] = 0, \text{ for } k < 0;$$

$$g_i[k] = \sum_{i=0}^{4} f[i]g_s[k-i], \text{ for } 0 <= k <= (Ng+3);$$

and $$g_i[k] = 0, \text{ for } k >= Ng+4;$$

where the bit response (g[k]) is defined by equations (9) which are restated below for simplicity:

$$g_s[k] = -0.5 \sum_{i=0}^{Ng} g_b[i], \text{ for } k < 0;$$

$$g_s[k] = 0.5 \left( \sum_{i=0}^{k} g_b[i] - \sum_{i=k+1}^{Ng} g_b[i] \right), \text{ for } 0 <= k <= (Ng-1);$$

and $$g_s[k] = 0.5 \sum_{i=0}^{Ng} g_b[i], \text{ for } k >= Ng.$$

Once the impulse response for the channel is available (block 405), it can be used to determine pre-compensation values 209 for various bit patterns received as read back signal 205. In particular, a preceding bit pattern along with a current bit transition status is determined (block 410). In some embodiments of the present invention, determining the preceding bit patterns and bit transition status is done in accordance with equation (1b), equation (3), equation (12), and equation (8c) which are all restated below for simplicity:

$$b[n] = a[n] - a[n-1];$$

$$c_k[n] = \frac{(1+S_{k0}a[n])*(1+S_{k1}a[n-1])*(1+S_{k2}a[n-2])*(1+S_{k3}a[n-3])}{16};$$

$$\hat{b}_j[n] =$$
$$\{[S_{j3}(S_{j0}S_{j1}-1)a[n-3] + (S_{j1}-S_{j0})(a[n]-a[n-1])]S_{j1}S_{j2}a[n-2] +$$
$$S_{j3}(S_{j0}S_{j1}-1)a[n-1]a[n-3] - S_{j3}(S_{j0}S_{j1}-1)a[n]a[n-3] +$$
$$(S_{j1}-S_{j0})(S_{j2}a[n-2] + S_{j3}a[n-3])a[n]a[n-1] +$$
$$S_{j2}S_{j3}(S_{j0}S_{j1}-1)(a[n-1]-a[n])a[n-2]a[n-3]\}/16;$$

and $$b_j[n] = c_j[n] * b[n].$$

In addition, equalized channel response 222 is computed based on estimated NLTS values 232 (block 415).

$$d[n] = \sum_{k=0}^{Ng} a[n-k]g_b[k] - \sum_{j=1}^{8} \hat{\Delta}_j \sum_{k=L1}^{L2} b_j[n-k]g_i[k].$$

In addition, the error term is calculated (block 420) by subtracting the equalized channel response 222 from equalized read back signal 212 according to the following equation:

$$e[n] = x[n] - d[n].$$

Using the results of the forgoing steps (blocks 410-420), a pre-compensation value for the particular preceding bit pattern and transition status is calculated (block 425). In some embodiments of the present invention, calculating the particular pre-compensation value is done based on an estimated NLTS value that is calculated in accordance with equation (8a) which is restated below for simplicity.

$$\hat{\Delta}_l[n+1] = \hat{\Delta}_l[n] - 2\mu e[n] \sum_{k=L1}^{L2} \hat{b}_l[n-k]g_i[k],$$

for l = 1, 2, ..., 8.

The pre-compensation value is calculated to negate the estimated NLTS value and in some cases is the negative of the estimated NLTS value.

At this juncture, a pre-compensation value has been calculated for one particular input pattern. This value is stored in a memory indexed to the preceding bit pattern to which it corresponds. It is determined whether all of the pre-compensation write values are available by determining whether the NLTS values corresponding to each of the pre-compensation values have converged (block 430). It should be noted that each estimated NLTS value may be calculated a number of times until the particular NLTS estimate converges on a particular value. Such an approach provides for an adaptive determination of the estimated NLTS values and corresponding pre-compensation values. Convergence may be determined by, for example, subtracting the current estimated NLTS value from a preceding estimated NLTS value for each particular bit pattern and determining whether the difference is below an acceptable threshold value. It may be that for each particular bit pattern that the difference between successive NLTS values must remain below a threshold value for a defined number of occurrences before convergence is deemed to have occurred. Based on the disclosure provided herein, one of ordinary skill in the art will recognize a variety of approaches that may be used for testing convergence in accordance with different embodiments of the present invention. Where one or more estimated NLTS values remain to converge (block 430), the bit instance is incremented (block 440) and the processes of blocks 410-440 are repeated for the next sample of read back signal 205.

Alternatively, where all of the estimated NLTS values for the various preceding bit patterns have converged (block 430), the table of pre-compensation values is prepared for use in relation to writing a magnetic storage medium. It is determined whether a write bit is prepared for writing to the magnetic storage medium (block 450). Where a bit is ready for writing (block 450), the preceding bit pattern is determined along with the transition status (block 455). Where a transition is indicated, a pre-compensation value corresponding to the determined preceding bit pattern is retrieved from the memory (block 460), and the write is modified based on the selected pre-compensation value retrieved from the memory (block 465). This process of modifying write values based on pre-compensation values retrieved from the memory is repeated for subsequent write operations. It should be noted that some of the equations described in relation to flow diagram 400 are particular to the generation of eight different pre-compensation values, but that other embodiments of the present invention may be tailored for generating a different number of pre-compensation values.

In some cases, it is desirable to simplify the implementation described above in relation to FIGS. 2-3 and improve the estimation accuracy. Various modifications may be made to the preceding embodiments that provide either or both of improved accuracy and simplification of the implementation. Table 1 above shows that the first two patterns corresponding to k=1 and k=2 may be used as reference patterns for patterns (k=3, 5 or 7) and (k=4, 6 or 8), respectively. Without loss of generality, it is possible to set the corresponding reference delays $\delta_1$ and $\delta_2$ to zero. Thus, an adaptive algorithm capable of estimating only six of the eight NLTS values (i.e., values corresponding to k=3, 4, 5, 6, 7, 8) is sufficient. It should be noted that while this discussion is particular to modifying a eight level pre-compensation to a six-level pre-compensation, that a similar approach may be applied to modifying a different number of pre-compensation levels to a lesser number of levels.

Further, computation of the equalized channel response, d[n], may be modified. Since $c_j[n]$ are binary valued with $c_j[n] \in \{0,1\}$ and b[n] are ternary values with $b[n] \in \{-2,0,2\}$, the quantities $b_j[n]$ are ternary valued with $b_j[n] \in \{-2,0,2\}$. Further, the original write signal a[n] is binary valued with $a[n] \in \{-1,+1\}$. Based on these, the computation of d[n] can be simplified where an assumption is made that $\hat{\Delta}_j[n] \approx \hat{\Delta}_j[n-k]$, for k=0, 1, 2, . . . , Ng+3. Such a simplification is reflected in the following equations:

$$d[n] = d_1[n] - \sum_{k=0}^{Ng+3} \hat{\Delta}[n-k]g_i[k], \quad (13a)$$

$$d_1[n] = \sum_{k=0}^{Ng} a[n-k]g_b[k], \quad (13b)$$

$$\hat{\Delta}[n] = \sum_{j=1}^{8} \hat{\Delta}_j[n]b_j[n]. \quad (13c)$$

Of note, the computation of $d_1[n]$ and $\hat{\Delta}[n]$ require only additions since $a[n] \in \{-1,+1\}$ and $b_j[n] \in \{-2,0,2\}$.

Yet further, from Table 1 above it is noted that $S_{j0}=-S_{j1}$ for j=1, 2, . . . , 8. Based on this, the expression for $\hat{b}_j[n]$ can be simplified according to equation (14) as follows:

$$\hat{b}_j[n] = \{(-S_{j3}a[n-3] + S_{j1}a[n] - S_{j1}a[n-1])S_{j1}S_{j2}a[n-2] -$$
$$S_{j3}a[n-1]a[n-3] + S_{j3}a[n]a[n-3] +$$
$$S_{j1}(S_{j2}a[n-2] + S_{j3}a[n-3])a[n]a[n-1] -$$
$$S_{j2}S_{j3}((a[n-1]-a[n])a[n-2]a[n-3]\}/8$$

As discussed above, some of the second order terms were removed from $b_j[n]$ to reduce the effects of MR asymmetry. However, because not all of the second order terms were removed, the adaptive estimation still exhibited some dependency on MR asymmetry. This effect can be substantial where the MR asymmetry is significant. In a recording system where a significant MR asymmetry remains after the analog front end, near optimal write pre-compensation values are not achievable. Using the modified algorithm, the remaining second order terms from $b_j[n]$ can be removed, thus eliminating the effect of MR asymmetry, even where residual MR asymmetry remains high. Removing all of the second order terms can be accomplished by replacing $\hat{b}_j[n]$ with $\breve{b}_j[n]$ which is obtained using the following equations:

$$\breve{b}_j[n] = \hat{b}_j[n] + \hat{b}_{j+1}[n], \text{ for } j=3, 5, 7; \text{ and} \quad (15a)$$

$$\breve{b}_j[n] = 0, \text{ for } j=4, 6, 8. \quad (15b)$$

Using equation (14) and equations (15) together, the simplified $\breve{b}_j[n]$ can be expressed as follows:

$$\breve{b}_j[n] = \frac{\left\{ \begin{array}{c} S_{j1}(S_{j2}a[n-2] + S_{j3}a[n-3])a[n]a[n-1] - \\ S_{j2}S_{j3}(a[n-1]-a[n])a[n-2]a[n-3] \end{array} \right\}}{4}, \quad (16a)$$

for j = 3, 5, 7;

and $$\breve{b}_j[n] = 0, \quad (16b)$$

for j = 4, 6, 8.

Of note, $\breve{b}_j[n]$ includes only third order terms. Therefore, by using $\breve{b}_j[n]$ in place of $\hat{b}_j[n]$ for updating the NLTS estimates, the estimation of NLTS will be immune from the amount of MR asymmetry present after the analog front end. Using equations (17), calculation of the pre-compensation values may be done according to the following equations:

$$\hat{\Delta}_l[n+1] = \hat{\Delta}_l[n] - 2\mu e[n] \sum_{k=0}^{Ng+3} \left( \begin{array}{c} \hat{b}_l[n-k] + \\ \hat{b}_{l+1}[n-k] \end{array} \right) g_i[k], \quad (17a)$$

for l = 3, 5, 7;

and $$\hat{\Delta}_l[n+1] = \hat{\Delta}_{l-1}[n+1], \quad (17b)$$

for l = 4, 6, 8, where $\hat{b}_j[n]$ is same as that defined in equation (14) above. Thus, with only minimal changes in the updating equation, a three level pre-compensation strategy is achieved that is immune to any amount of MR asymmetry present in the channel.

Figure 4:
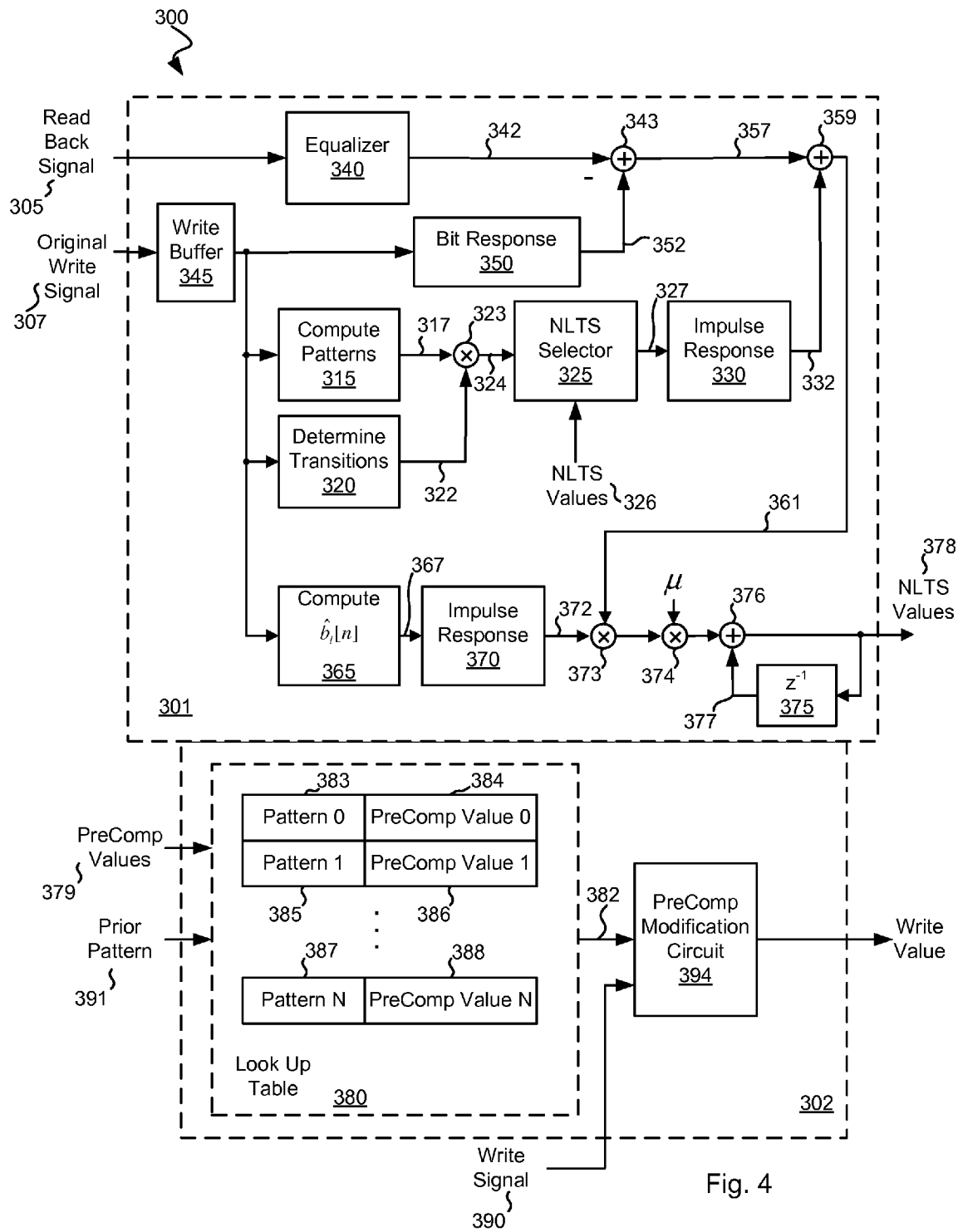
FIG. 4 shows another implementation of the adaptive pre-compensation estimation module of FIG. 1 in accordance with other embodiments of the present invention.

Turning to FIG. 4, an adaptive pre-compensation estimation module 300 embodying the aforementioned modifications is depicted in accordance with other embodiments of the present invention. Adaptive pre-compensation estimation module 300 includes a pre-compensation determination circuit 301 (shown in dashed lines) and a pre-compensated write circuit 302 (shown in dashed lines). Pre-compensation determination circuit 301 includes an equalizer 340 that equalizes a read back signal 305 (e.g., data received from a read/write head assembly). Equalizer 340 may be any circuit known in the art that is capable of performing signal equalization. In one particular embodiment of the present invention, equalizer 340 is a digital finite impulse response circuit. Equalizer 340 generates an equalized read back signal 342, x[n], in accordance with the following equations:

$$x[n] = \sum_{k=0}^{Ng} a[n-k]g_b[k] - \sum_{k=L1}^{L2} \hat{\Delta}[n-k]b[n-k]g_i[k] + v[n];$$

and $$b[n] = a[n] - a[n-1],$$

where a[n] is an original write signal 307 provided via a write buffer 345 to a bit response calculation circuit 350, a pattern computation circuit 315, a transition determination circuit 320, and a computation circuit 365. Write buffer 345 may be any device or circuit capable of receiving the originally written data and storing it for later retrieval. For establishing pre-compensation values, a random pattern provided as original write signal 307 may be preferred over a periodic pattern.

Bit response circuit 350 receives original write signal 307 from write buffer 345 and determines a bit response output 352, $d_1[n]$, set forth above as equation (13b):

$$d_1[n] = \sum_{k=0}^{Ng} a[n-k]g_b[k].$$

Bit response output 352 is subtracted from equalized read back signal 342 using a summation element 343. An output 357 of summation element 343 is an error value denoted by the following equation:

$$e_1[n]=x[n]-d_1[n].$$

Pattern computation circuit 315 receives original write signal 307 and provides an output 317 indicating which identifiable pattern was received prior to the current bit instance. In this case, there are six identifiable patterns—the preceding bit patterns corresponding to k=3, 4, 5, 6, 7 and 8 in Table 1 above. It should be noted that fewer or more bit patterns may be identified in accordance with different embodiments of the present invention. The bit patterns are computed in accordance with the following equation:

$$c_j[n] = \frac{\begin{pmatrix}(1+S_{k0}a[n])*(1+S_{k1}a[n-1])* \\ (1+S_{k2}a[n-2])*(1+S_{k3}a[n-3])\end{pmatrix}}{(16)},$$

for $j = 3, 4, \ldots, 8$.

In addition, original write signal 307 is provided to transition determination circuit 320 that yields a transition output 322, b[n], that indicates the occurrence of a transition related to the most recent bit in accordance with the following equation:

$$b[n]=a[n]-a[n-1].$$

Output 317 is multiplied by transition output 322 using a multiplier 323 to yield a combined output 324, $b_j[n]$, which indicates which pattern is detected and whether a transition occurred. Based on output 324 and prior NLTS values, $\hat{\Delta}_j[n]$, NLTS values 327 can be calculated by an NLTS selector circuit 325 using the following equation:

$$\hat{\Delta}[n] = \sum_{j=3}^{8} \hat{\Delta}_j[n]b_j[n].$$

Of note, only six computations (i.e., j=3 to 8) are required to yield the entire set of pre-compensation values. NLTS values 327 are provided to an impulse response calculation circuit 330. Impulse response calculation circuit 330 provides an impulse response output 332, $d_2[n]$, in accordance with the following equation:

$$d_2[n] = \sum_{k=0}^{Ng+4} \hat{\Delta}[n-k]g_i[k].$$

Impulse response output 332 is added to error value 357 using a summation element 359 to yield an overall error output 361, e[n].

Computation circuit 365 receives original write signal 307 and provides an output 367 in accordance with the following equation:

$$\hat{b}_l[n] = S_{l2}a[n]a[n-2] - S_{l1}S_{l2}S_{l3}a[n-3]a[n-2] - S_{l2}a[n-1]a[n-2] -$$
$$S_{l3}\{a[n-1]a[n-3] - a[n]a[n-3]\} + S_{l1}S_{l2}a[n]a[n-1]a[n-2] -$$
$$S_{l2}S_{l3}\{a[n-1] - a[n]\}a[n-2]a[n-3] + S_{l1}S_{l3}a[n]a[n-1]a[n-3],$$

for $l = 3, 4, \ldots, 8$.

Output 367 is provided to an impulse response circuit 370 that generates an impulse response output 372, $d_{3l}[n]$, in accordance with the following equation:

$$d_{3l}[n] = \sum_{k=0}^{Ng+4} \hat{b}_l[n-k]g_i[k],$$

for $l = 3, 4, \ldots, 8$.

Impulse response output 372 is multiplied by overall error output 361 using a multiplier 373, and the result thereof is multiplied by μ using a multiplier 374. A resulting product 376 is added with a prior NLTS value 377 available from element 375, and the result is an estimated NLTS value 378 in accordance with the following equations which are a restatement equation (17) above:

$$\hat{\Delta}_l[n+1] = \hat{\Delta}_l[n] - 2\mu e[n]\sum_{k=0}^{Ng+3} \hat{b}_l[n-k]g_i[k], \quad (17)$$

for $l = 3, 4, 5, 6, 7, 8$.

Pre-compensated write circuit 302 includes a memory in which a lookup table 380 is implemented. Lookup table 380 stores pre-compensation values 379 in association with a prior pattern to which they respectively correspond. Pre-compensation values 379 are calculated based on the NLTS values 378 to negate the effect of NLTS in the system. In one particular implementation, pre-compensation values 379 are the negative of respective corresponding NLTS values 378. To obtain a pre-compensation value associated with a particular prior pattern 391, the particular pattern or some unique variation thereof may be used to address lookup table 380. In particular, lookup table 380 includes a pre-compensation value 384 corresponding to a preceding pattern 383, a pre-compensation value 386 corresponding to a preceding pattern 385, and a pre-compensation value 388 corresponding to a preceding pattern 387. Based on the disclosure provided herein, one of ordinary skill in the art will recognize that practically any quantity of pre-compensation values corresponding to different patterns may be stored in lookup table 380. When a particular pattern or a unique variation thereof is used to address lookup table 380, the corresponding pre-compensation value is provided as an output 382. A write signal 390 is provided to a pre-compensation modification circuit 394 that modifies the write signal using output 382. The modification operates to negate the NLTS identified by pre-compensation determination circuit 301.

It should be noted that while various components of adaptive pre-compensation estimation module 300 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive pre-compensation estimation module 300 is implemented entirely as firmware or software being executed by a processor. In other embodiments of the present invention, adaptive pre-compensation estimation module 300 is implemented entirely as a dedicated electronic circuit. In yet other embodiments of the present invention, adaptive pre-compensation estimation module 300 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

The impulse response may be calculated in accordance with the following equations (18):

$$g_s[k]=-0.5(g_b[0]+g_b[1]+g_b[2]), \text{ for } k<=-1;$$

$$g_s[0]=0.5(g_b[0]-g_b[1]-g_b[2]);$$

$$g_s[1]=0.5(g_b[0]+g_b[1]-g_b[2]); \text{ and}$$

$$g_s[k]=0.5(g_b[0]+g_b[1]+g_b[2]), \text{ for } k>=2.$$

$$g_i[k]f[0](g_s[k]-g_s[k-4])+f[1](g_s[k-1]-g_s[k-3]), \text{ for } k=0, 1, 2, 3, 4, 5; \text{ and}$$

$$g_i[k]0, \text{ for } k<=-1 \text{ and } k>=6.$$

In one particular case, f[0] is −0.2593 and f[1] is 0.8584.

The adaptation gain, $\mu$, is chosen to control the convergence speed. A set of values given by $2^{-\beta}$ where $\beta \in \{24, 25, \ldots, 29\}$ has been found to be sufficient in some embodiments to cover the desired range. In this case, let M1 be the latency from the equalizer (i.e., equalizer 210 or equalizer 340) to the detector output. That is, the data decision corresponding to the equalizer output x[n] is â[n+M1]. Then, to compute the model output corresponding to x[n] in adaptive pre-compensation estimation module 300, â[n+M1−m] is needed. Consequently, a[n] should correspond to â[n+M1]. Thus, the latency between the equalizer output samples x[n] and the data bits and transitions that are used in the channel models is M1.

In some cases, it may be desirable to slow down an update of the pre-compensation values. This may be achieved by updating the NLTS parameters, for example, once in every four, eight or twelve bits (i.e., Ns). A convenient number may be twelve since in some cases we are using three or six NLTS parameters to estimate. A possible procedure for doing the adaptation once every Ns bits is as follows for the case of six level pre-compensation, however, it should be noted that the procedure may be modified for performing different levels of pre-compensation. The process begins by initializing the NLTS estimates as $\hat{\Delta}_l[1]=0$, for $l=3, 4, \ldots 8$. From the given target coefficients, $g_b[k]$, the impulse response coefficients, $g_i[k]$, are calculated using equations (18). In addition, $G_l$ used for accumulating gradients is set to zero for $l=3, 4, \ldots 8$.

As a second step, where the index bit n is not a multiple of Ns, e[n] and d[n] are computed using equations discussed above in relation to FIG. 4. Further, the gradients are accumulated in accordance with the following equations:

$$G_l \leftarrow G_l+e[n]*d_{3l}[n]; \text{ and}$$

$\hat{\Delta}_l[n+1]$ is set equal to $\hat{\Delta}_l[n]$ for $l=3, 4, \ldots, 8$. Alternatively, if n is a multiple of Ns, the NLTS estimates are updated in accordance with the following equation:

$$\hat{\Delta}_l[n+1]=\hat{\Delta}_l[n]-\mu*G_l, \text{ for } l=3, 4, \ldots, 8.$$

In addition, $G_l=0$, for $l=3, 4, \ldots, 8$ to allow for accumulating the gradients. In one particular embodiment of the present invention, a value of Ns=12 provides reasonable performance.

Alternatively, it may be the case that only one NLTS values is updated on each bit period. The procedure for doing the adaptation of one NLTS parameter per bit period is as follows for a six level pre-compensation. First, the NLTS estimates are initialized to zero in accordance with the following equation:

$$\hat{\Delta}_l[1]=0, \text{ for } l=3, 4, \ldots, 8.$$

From the given target coefficients, $g_b[k]$, the impulse response coefficients, $g_i[k]$, are calculated using equations (18). In addition, e[n] is computed using equations discussed above in relation to FIG. 4, and the value of $l_n=\text{mod}(n,6)+3$. The estimate of the $l_n^{th}$ NLTS parameter is calculated using the equations discussed above in relation to FIG. 4 where $l=l_n$, and $\hat{\Delta}_l[n+1]=\hat{\Delta}_l[n]$ for $l \neq l_n$. Again, the above mentioned approach can be modified for use in relation to different levels of pre-compensation.

Based on the disclosure provided herein, one of ordinary skill in the art will appreciate a number of advantages that may be achieved through use of embodiments of the present invention. For example, some embodiments of the present invention provide a non-search based approach for yielding NLTS estimates and the corresponding pre-compensation values. This results in a relatively quick and simple approach for determining pre-compensation values. Further, some embodiments of the present invention provide an adaptive approach for yielding write pre-compensation values that is relatively easy to implement and is expandable to cover both single level pre-compensation and multi-level pre-compensation. Yet further, some embodiments of the present invention are substantially immune to MR asymmetry evident in the channel. Yet further, some embodiments of the present invention can be used as a tool to characterize the amount of non-linear distortion due to NLTS. Based on the disclosure provided herein, one of ordinary skill in the art will recognize other advantages and features achievable through use of one or more embodiments of the present invention.

In some embodiments of the present invention, write pre-compensation values are calculated at startup or at some point in the device fabrication process and the same write pre-compensation values are used from there forward in relation to write operations. Such an approach relies on relatively static write pre-compensation values, which do not account for changes in the read/write head assembly over time. In particular embodiments of the present invention, the determination of write pre-compensation values is done periodically by writing a pseudo-random pattern to a free location on the storage medium and using the written data the pre-compensation values are calculated. Such an approach allows for addressing changes in the read/write head assembly over time, but requires rendering the storage medium unusable for a period of time. In yet other embodiments of the present invention, write pre-compensation values are determined using user data. In such cases, determination of the write pre-compensation values can be done on-the-fly in parallel with the processing of user data. Such an approach allows for the write pre-compensation values to be continuously updated without taking the storage medium out of its normal operational mode. Continuous updating allows for compensating for changes in the read/write head assembly that occur over time. In some cases, the periodic updating occurs during defined periods of user operation, and then is inoperable during other times. For example, continuous updating may occur once each twenty-four hours and proceed in parallel with normal usage of the storage medium. Based on the disclosure provided herein, one of ordinary skill in the art will recognize a variety of intervals and/or update periods that may be used depending upon various implementation and/or operational requirements. In some embodiments of the present invention offering continuous update capability, a new pre-compensation value may be calculated on-the-fly and compared with a corresponding, previously stored write pre-compensation value. From this comparison it can be determined if the characteristics of the read/write head assembly have changed such that new write pre-compensation values should be determined. Where new values are needed, such values are calculated and updated in the various zone tables governing the modification of writes.

Figure 5:
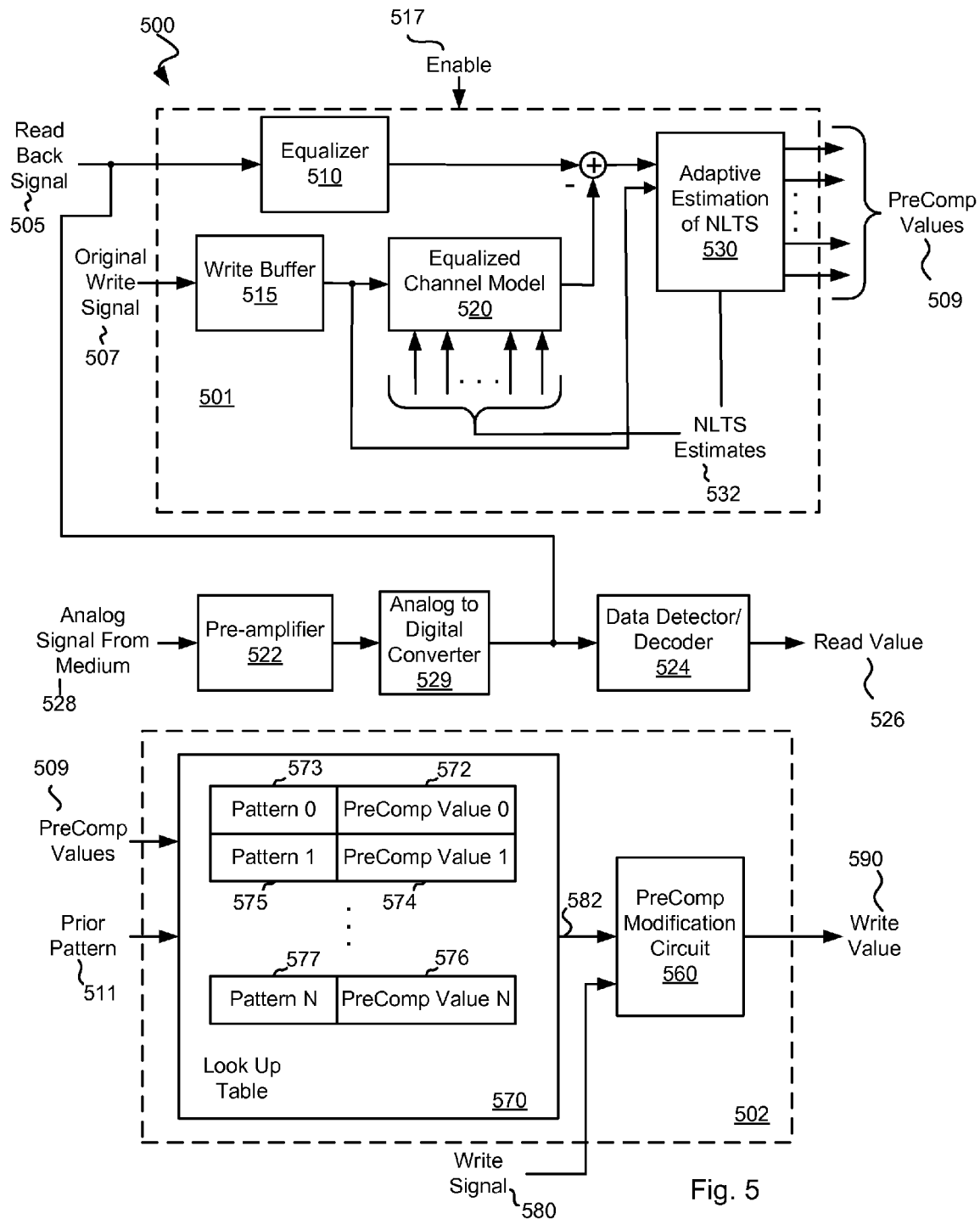
FIG. 5 depicts an on-the-fly, adaptive pre-compensation estimation system in accordance with various embodiments of the present invention.

Turning to FIG. 5, an on-the-fly, adaptive pre-compensation estimation system 500 is shown in accordance with various embodiments of the present invention. On-the-fly, adaptive pre-compensation estimation system 500 includes a pre-compensation determination circuit 501 (shown in dashed lines) and a pre-compensated write circuit 502 (shown in dashed lines). Pre-compensation determination circuit 501 operates in parallel with a standard read data path. The standard read path may be any data path capable of receiving analog data from a storage medium and providing a digital representation thereof to a requester. In this case, the standard read path includes a pre-amplifier 522 receiving an analog signal derived from a storage medium, and providing an amplified signal to an analog to digital converter 529. The digital samples from analog to digital converter 529 are provided as a read back signal 505 to pre-compensation determination circuit 501, and as an input to a data detector/decoder 524 circuit that provides read values 526 to a requester. Of note, pre-compensation determination circuit 501 operates on the same data input stream and in parallel to data detector/decoder 524.

In some cases, pre-compensation determination circuit 501 is used during defined periods to update pre-compensation values 509, or continuously to provide a constant update of pre-compensation values 509. The updated pre-compensation values are later used by pre-compensated write circuit 502 to perform data writes to the medium from which analog signal 528 is derived. Pre-compensation determination circuit 501 includes an equalizer 510 that equalizes a read back signal 505 (e.g., data received from a read/write head assembly), a write buffer 515 that receives and stores an original write signal 507, an equalized channel model 520, an adaptive estimation of NLTS 530 that provides NLTS estimates 532 and pre-compensation values 509. Pre-compensation determination circuit 501 operates similar to that discussed above in relation to FIG. 2. An enable signal 517 is provided to enable operation of pre-compensation determination circuit 501. In some cases, enable signal 517 is asserted periodically such that a continuous update of write pre-compensation values occurs only occasionally. In some cases, enable signal 517 is asserted all the time resulting in a constant, continuous update. In other cases, enable signal 517 is only asserted when it is determined that a change may have occurred to an associated read/write head assembly necessitating the calculation of updated write pre-compensation values. Determining the need for updated write pre-compensation values may be indicated by an increased error rate detected by data detector/decoder 524, or a comparison indicating a substantial difference between a newly calculated write pre-compensation value with one previously stored to a lookup table 570.

Pre-compensated write circuit 502 includes a memory in which a lookup table 570 is implemented. Lookup table 570 stores pre-compensation values 509 in association with a preceding pattern 511 to which they respectively correspond. Said another way, to obtain a pre-compensation value associated with a particular pattern, the particular pattern or some unique variation thereof may be used to address lookup table 570. In particular, lookup table 570 includes a pre-compensation value 572 corresponding to a pattern 573, a pre-compensation value 574 corresponding to a pattern 575, and a pre-compensation value 576 corresponding to a pattern 577. When a particular pattern or a unique variation thereof is used to address lookup table 570, the corresponding pre-compensation value is provided as an output 582. A write signal 580 is provided to a pre-compensation modification circuit 560 that modifies the write signal using output 582. The modification operates to negate the NLTS identified by pre-compensation determination circuit 501.

It should be noted that while various components of adaptive pre-compensation estimation module 500 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. In some embodiments of the present invention, adaptive pre-compensation estimation module 500 is implemented entirely as firmware or software being executed by a processor. In other embodiments of the present invention, adaptive pre-compensation estimation module 500 is implemented entirely as a dedicated electronic circuit. In yet other embodiments of the present invention, adaptive pre-compensation estimation module 500 is implemented as a combination of firmware or software being executed on a processor, and dedicated electronic circuitry. Based on the disclosure provided herein, one of ordinary skill in the art will recognize a variety of combinations of dedicated electronic circuitry and software/firmware that may be used in accordance with different embodiments of the present invention.

Figure 6:
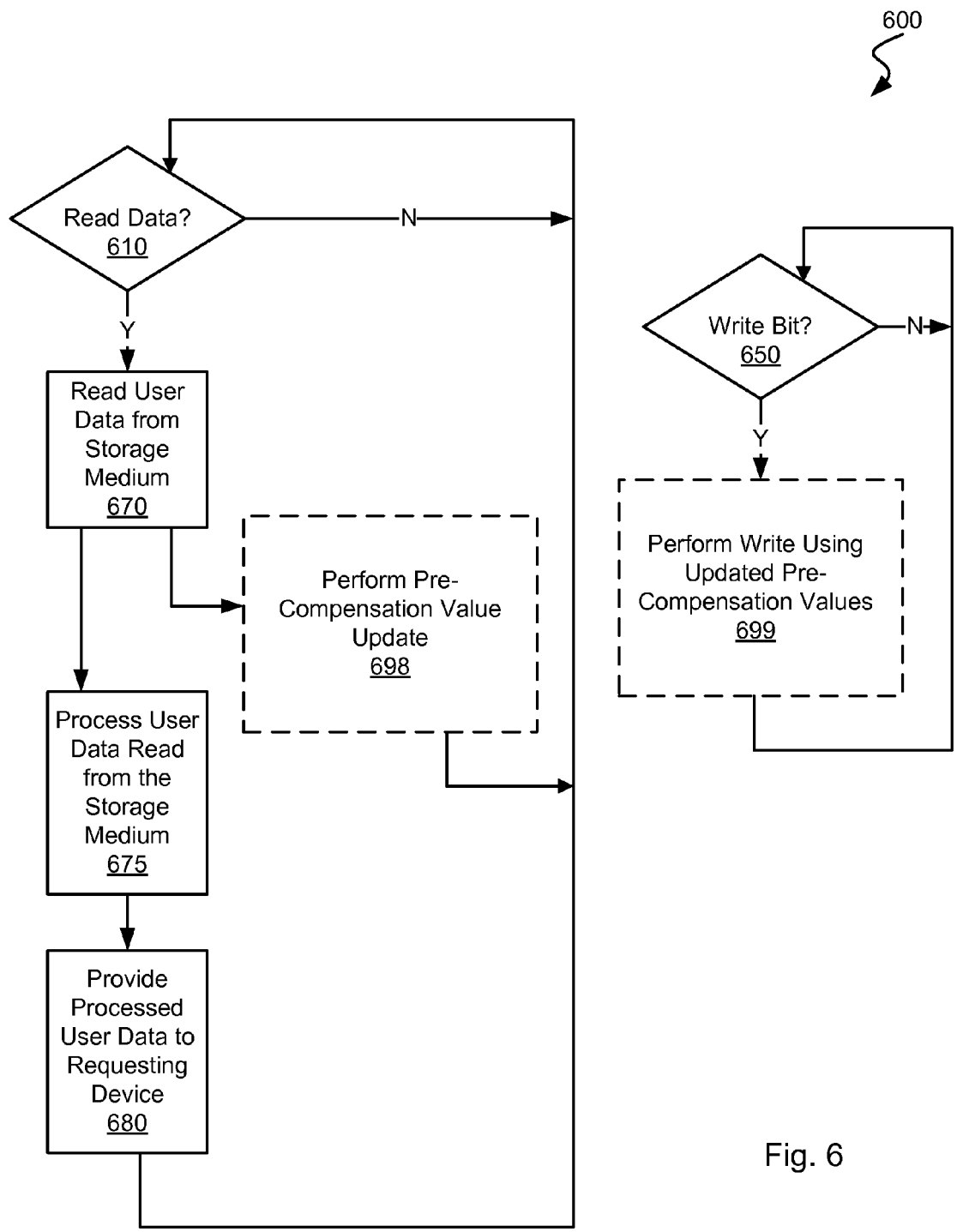
FIG. 6 is a flow diagram depicting a method for continuous, on-the-fly adaptive pre-compensation in accordance with some embodiments of the present invention.

Turning to FIG. 6, a flow diagram 600 depicts a method for continuous on-the-fly adaptive pre-compensation in accordance with some embodiments of the present invention. Following flow diagram 600, it is determined if data is to be read from a storage medium (block 610). Such a determination may correspond, for example, to receiving a read request from a requesting device. Where a read request is received (block 610), user data at an address indicated by the read request is retrieved from the storage medium (block 670). In an exemplary case, retrieving the user data includes sensing a magnetic signal on a storage medium and amplifying an analog signal corresponding to the sensed magnetic signal.

The analog signal is then converted to a series of digital samples using an analog to digital converter. The user data is provided to a standard data path for processing read data (block 675), and the result of the standard data path is the original data stored to the storage medium that is provided as a processed user data output to a requesting device (block 680).

In addition, the retrieved user data (block 670) is provided to a pre-compensation estimation circuit. The pre-compensation estimation circuit operates in parallel to the standard read path and performs a pre-compensation value update based on the received user data (block 698). Such pre-compensation estimates may be generated adaptively using the processes discussed above in relation to FIGS. 2-4. For example, the processes of block 698 may be similar to the processes of block 498 of FIG. 3. The process of reading data, providing the read data to a requesting device, and estimating and updating pre-compensation values is performed continuously. When a write to the storage medium is desired (block 650), the write is performed using the most recently updated write pre-compensation value corresponding to the pattern preceding the write as was discussed above (block 699).

Figure 7:
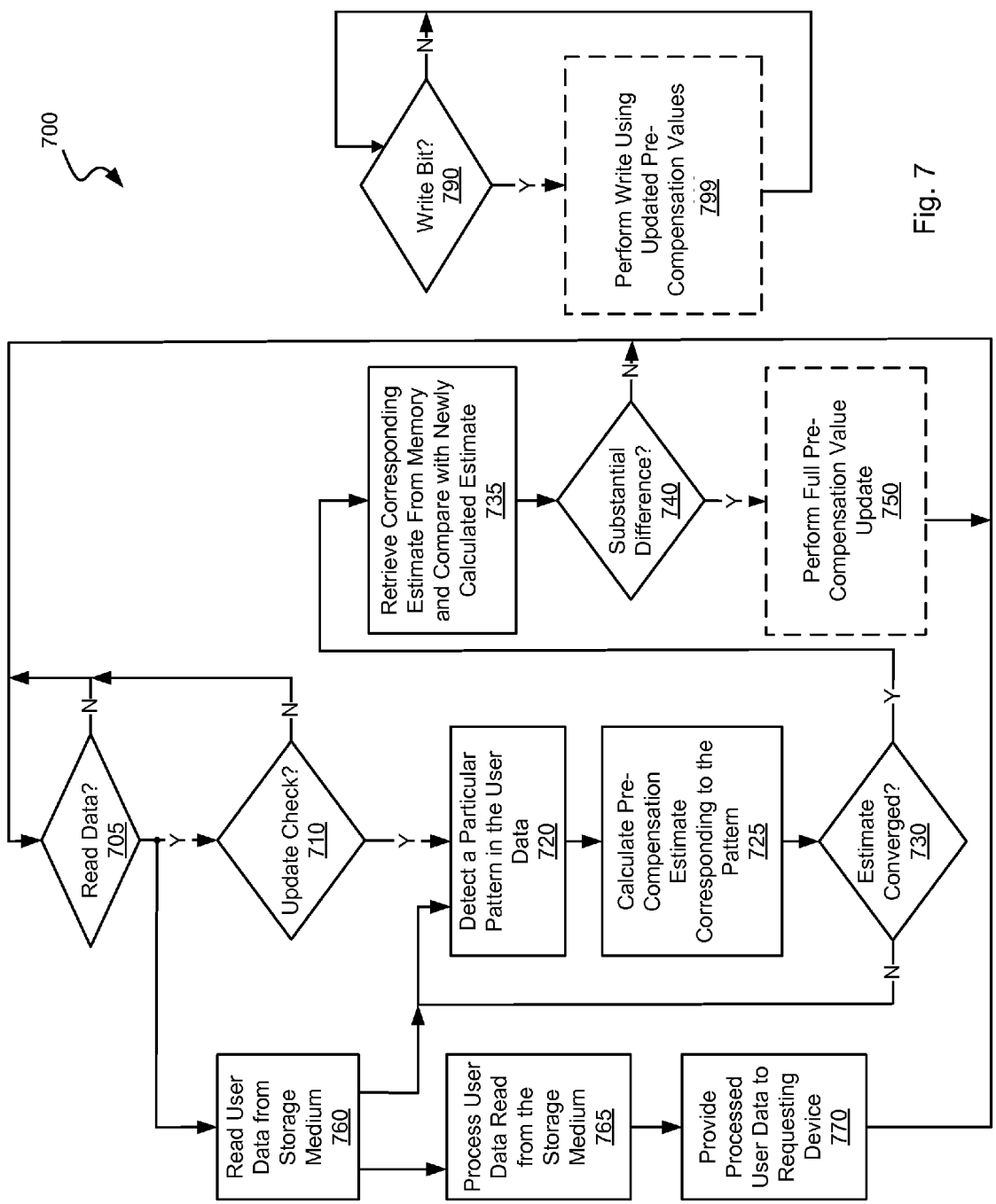
FIG. 7 is a flow diagram depicting a method for periodic, on-the-fly adaptive pre-compensation in accordance with some embodiments of the present invention.

Turning to FIG. 7, a flow diagram 700 shows a method for periodic, on-the-fly adaptive pre-compensation in accordance with some embodiments of the present invention. Following flow diagram 700, it is determined if data is to be read from a storage medium (block 705). Such a determination may correspond, for example, to receiving a read request from a requesting device. Where a read request is received (block 705), user data at an address indicated by the read request is retrieved from the storage medium (block 760). In an exemplary case, retrieving the user data includes sensing a magnetic signal on a storage medium and amplifying an analog signal corresponding to the sensed magnetic signal. The analog signal is then converted to a series of digital samples using an analog to digital converter. The user data is provided to a standard data path for processing read data (block 765), and the result of the standard data path is the original data stored to the storage medium that is provided as a processed user data output to a requesting device (block 770).

In addition, it is determined whether it is time to check whether the pre-compensation values need to be updated (block 710). In some cases, the check period may be associated with a period timer or may be associated with detection of a certain error rate threshold associated with the returned data. Based on the disclosure provided herein, one of ordinary skill in the art will recognize a variety of circumstances that may be used in determining whether an update of write pre-compensation values is warranted. Where an update check is called for (block 710), a particular pattern in the received user data is identified (block 720), and a pre-compensation estimate corresponding to the pattern is calculated (block 725). This calculation may be done using one of the approaches discussed above in relation to FIGS. 2-4, or using another approach for calculating pre-compensation values. It is determined if the pre-compensation value has converged (block 730). Where it has not converged (block 730), the processes of blocks 720-730 are repeated until convergence is obtained. Alternatively, where the pre-compensation value for the particular pattern has converged (block 730), a previously determined pre-compensation value corresponding to the same pattern is retrieved from memory (block 735). The newly calculated values and the retrieved value are compared (block 735), and it is determined whether there is a substantial difference between the two values (block 740). Where there is not a substantial difference (block 740), the process of determining whether an update is necessary completes.

Alternatively, where there is a substantial difference (block 740), a full update of the pre-compensation values is performed using user data retrieved from the storage medium (block 750). A substantial difference may indicate a change in the read/write head assembly warranting modified pre-compensation values. The full update of the pre-compensation values includes providing user data to a pre-compensation estimation circuit. The pre-compensation estimation circuit operates in parallel to the standard read path and performs a pre-compensation value update based on the received user data (block 750). Such pre-compensation estimates may be generated adaptively using the processes discussed above in relation to FIGS. 2-4. For example, the processes of block 750 may be similar to the processes of block 498 of FIG. 3. The process of reading data, providing the read data to a requesting device, and estimating and updating pre-compensation values is performed periodically upon determination that one or more pre-compensation values have drifted from an earlier calculated pre-compensation value. When a write to the storage medium is desired (block 790), the write is performed using the most recently updated write pre-compensation value corresponding to the pattern preceding the write as was discussed above (block 799).

It should be noted that the methods discussed in relation to FIG. 6 and FIG. 7 may be adapted for use in relation to adaptive pre-compensation estimation module 300 of FIG. 4 or other write pre-compensation calculation systems. The modification involves providing the read back data from user data either continuously or periodically as discussed in relation to the foregoing figures.

In conclusion, the invention provides novel systems, devices, methods and arrangements for performing write pre-compensation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for modifying magnetic information transfer, the method comprising:
   retrieving magnetically represented data from a storage medium;
   converting the magnetically represented data to a series of data samples;
   identifying a first preceding pattern and a first transition status in the series of data samples;
   determining a first current non-linear transition shift value based at least in part on the first preceding pattern, the first transition status, and a first previous non-linear transition shift value;
   identifying a second preceding pattern and a second transition status in the series of data samples, wherein a combination of the second preceding pattern and the second transition status is distinct from a combination of the first preceding pattern and the first transition status; and
   calculating a second current non-linear transition shift value based at least in part on the second preceding pattern, the second transition status, and a second previous non-linear transition shift value.

2. The method of claim 1, wherein the first error value and the second error value are computed using the same magnetically represented data derived from a single read operation.

3. The method of claim 2, wherein the series of data samples are obtained during a single, continuous read of the storage medium.

4. The method of claim 1, wherein the magnetically represented data is derived from a random data pattern previously written to the storage medium.

5. The method of claim 4, wherein the random data pattern is written to the storage medium using a single continuous write operation, and wherein the random pattern includes more data that the preceding pattern and the transition status.

6. The method of claim 1, the method further comprising:
computing an equalized channel response based at least in part on the magnetically represented data;
computing an error value, wherein the error value corresponds to a difference between an impulse response of the current non-linear transition shift value and the equalized channel response; and
computing a pre-compensation value based at least in part on the error value.

7. The method of claim 6, wherein the pre-compensation value is operable to compensate for the current non-linear transition shift value.

8. The method of claim 6, wherein the pre-compensation value includes at least one second order terms, and wherein the method further comprises:
eliminating at least one of the at least one second order terms in the computation of the pre-compensation value, wherein the effect of asymmetry is reduced.

9. The method of claim 6, the method further comprising:
storing the pre-compensation value in relation to the identified preceding pattern.

10. The method of claim 9, the method further comprising:
receiving a request to write a data set; and
using the pre-compensation value in relation to servicing the request to write the data set.

11. The method of claim 10, wherein using the pre-compensation value in relation to servicing the request to write the data set includes:
identifying a write pattern in the data set; and
using the identified write pattern to retrieve the stored pre-compensation value.

12. The method of claim 6, wherein the pre-compensation value includes at least one linear term, and wherein the method further comprises:
eliminating at least one of the at least one linear terms in the computation of the pre-compensation value, wherein the effect of linear mis-equalization is reduced.

13. The method of claim 6, wherein the pre-compensation value is a first pre-compensation value; wherein the equalized channel response is a first equalized channel response; wherein the error value is a first error value; and wherein the method further comprises:
computing a second equalized channel response based at least in part on the magnetically represented data;
computing a second error value, wherein the second error value corresponds to a difference between an impulse response of the second current non-linear transition shift value and the second equalized channel response; and
computing a second pre-compensation value based at least in part on the second error value.

14. The method of claim 1, wherein the method further comprises:
computing an impulse response of the current non-linear transition shift value.

15. The method of claim 1, wherein the storage medium is selected from a group consisting of: a longitudinal magnetic storage medium and a perpendicular magnetic storage medium.

16. The method of claim 1, wherein the preceding pattern is identified in accordance with a pre-compensation scheme selected from a group consisting of: a one level pre-compensation scheme, a two level pre-compensation scheme, a three level pre-compensation scheme, and a six level pre-compensation scheme.

17. A system for determining write pre-compensation values, the system comprising:
a storage medium, wherein a data set is stored on the storage medium;
a pre-compensation value calculation circuit, wherein the pre-compensation value calculation circuit includes:
an equalizer circuit operable to equalize the data set and to provide an equalized output;
a buffer, wherein the buffer stores a buffered output representing the data set;
an equalized channel model circuit, wherein the equalized channel model circuit is operable to provide an equalized channel response corresponding to a sum of a bit response of the buffered output and a combination of a current non-linear transition shift value and an impulse response of a transition in the data set; and
an adaptive non-linear transition shift estimation circuit, wherein the adaptive non-linear transition shift estimation circuit provides a subsequent non-linear transition shift value based in part on the equalized channel response and a portion of the equalized output, wherein the adaptive non-linear transition shift estimation circuit is implemented using a processor associated with a memory device, and wherein the memory device includes instructions in a non-transitory phase that are executable by the processor to calculate the subsequent non-linear transition shift value.

18. The system of claim 17, wherein the equalized channel model circuit is implemented using a processor associated with a memory device, and wherein the memory device includes instructions in a non-transitory phase that are executable by the processor to calculate the equalized channel response.

19. The system of claim 18, wherein the equalized channel response is calculated based on the following equation $$d[n] = \sum_{k=0}^{Ng} a[n-k]g_b[k] - \sum_{j=1}^{8} \hat{\Delta}_j \sum_{k=L1}^{L2} b_j[n-k]g_i[k].$$

20. The system of claim 17, wherein the subsequent non-linear transition shift value is calculated based on the following equation:

$$\hat{\Delta}_l[n+1] = \hat{\Delta}_l[n] - 2\mu e[n] \sum_{k=0}^{Ng+3} (\hat{b}_l[n-k] + \hat{b}_{l+1}[n-k])g_i[k],$$

wherein l is a defined integer value indexing the current non-linear transition shift value.

21. A system for determining write pre-compensation values, the system comprising:

a storage medium, wherein a data set is stored on the storage medium;

a converter circuit operable to converter the data set into a series of data samples;

a pre-compensation value calculation circuit, wherein the pre-compensation value calculation circuit is operable to:

receive the series of data samples;

identify a first preceding pattern and a first transition status in the series of data samples;

determine a first current non-linear transition shift value based at least in part on the first preceding pattern, the first transition status, and a first previous non-linear transition shift value;

identify a second preceding pattern and a second transition status in the series of data samples, wherein a combination of the second preceding pattern and the second transition status is distinct from a combination of the first preceding pattern and the first transition status; and calculate a second current non-linear transition shift value based at least in part on the second preceding pattern, the second transition status, and a second previous non-linear transition shift value.

* * * * *